United States Patent [19]

Hirosawa et al.

[11] Patent Number: 4,823,289

[45] Date of Patent: Apr. 18, 1989

[54] POSITIONING ORIGINALS ON AN ORIGINAL SCANNING DRUM OF AN IMAGE REPRODUCING SYSTEM

[75] Inventors: Makoto Hirosawa; Mitsuhiko Yamada, both of Kyoto, Japan

[73] Assignee: Dainippon Screen Mfg. Co., Ltd., Kyoto, Japan

[21] Appl. No.: 731,141

[22] Filed: May 6, 1985

[30] Foreign Application Priority Data

Jun. 8, 1984 [JP] Japan .................. 59-118720

[51] Int. Cl.⁴ .................... G03F 9/00; H04N 1/00
[52] U.S. Cl. .............................. 364/523; 354/7; 358/75; 358/287; 358/296; 430/22
[58] Field of Search ............... 364/518, 523; 358/256, 358/280, 285, 289, 75, 78, 287, 290, 291, 296; 354/7, 5; 355/40; 430/22

[56] References Cited

U.S. PATENT DOCUMENTS

| 3,264,106 | 8/1966 | Alldis | 430/22 |
|---|---|---|---|
| 3,391,392 | 4/1968 | Doyle | 364/518 |
| 3,828,319 | 8/1974 | Owen et al. | 358/256 |
| 4,214,276 | 7/1980 | Pugsley et al. | 358/256 |
| 4,327,380 | 4/1982 | Yamada et al. | 358/289 |
| 4,338,636 | 7/1982 | Yamada et al. | 358/75 |
| 4,338,673 | 7/1982 | Brown | 354/7 |
| 4,535,365 | 8/1985 | Sakamoto | 358/287 |
| 4,538,183 | 8/1985 | Kanno et al. | 358/287 |
| 4,538,183 | 8/1985 | Kanno et al. | 364/523 |
| 4,570,187 | 2/1986 | Ono et al. | 358/75 |
| 4,581,710 | 4/1986 | Hasselmeir | 364/523 |
| 4,589,144 | 5/1986 | Namba | 364/518 |
| 4,591,904 | 5/1986 | Urabe et al. | 358/75 |
| 4,608,664 | 8/1986 | Bartlett et al. | 364/523 |
| 4,622,591 | 11/1986 | Katsuyama et al. | 358/290 |
| 4,652,936 | 3/1987 | Hatayama | 358/287 |
| 4,656,504 | 4/1987 | Hirosawa | 358/78 |
| 4,673,989 | 6/1987 | Yamada et al. | 358/289 X |
| 4,733,304 | 3/1988 | Homma et al. | 358/280 |

FOREIGN PATENT DOCUMENTS

| 3235812 | 4/1983 | Fed. Rep. of Germany | 358/287 |
|---|---|---|---|
| 57-74740 | 3/1982 | Japan | 358/280 L |
| 58-200665 | 11/1983 | Japan | 358/280 L |
| 58-198960 | 11/1983 | Japan | 358/280 L |
| 59-58430 | 4/1984 | Japan | 358/280 L |

Primary Examiner—Parshotam S. Lall
Assistant Examiner—Joseph L. Dixon
Attorney, Agent, or Firm—Lowe, Price, LeBlanc, Becker & Shur

[57] ABSTRACT

Desired reproduction of images is obtained by framing originals on an original scanning drum for trimming based upon position and size data calculated by a CPU. Reproduction image position data are obtained from a block copy and magnification data. Scan start and scan end points for scanning of a plurality of original images are determined, prior to the scanning procedure, based on the configuration of frames provided in a translucent sheet obtained from recording trimming frames.

13 Claims, 4 Drawing Sheets

POSITIONING ORIGINALS ON AN ORIGINAL SCANNING DRUM OF AN IMAGE REPRODUCING SYSTEM

FIELD OF THE INVENTION

This invention relates to a method of and apparatus for positioning plural original images on an original image scanning drum of an image reproducing system so as to obtain reproduction images arranged precisely as desired.

BACKGROUND OF THE INVENTION

So-called composing scanners, which can reproduce images of desired areas of plural originals, have recently become practical. Such scanners also reproduce images arranged as desired, at desired magnifications. U.S. pat. application Ser. No. 625,782 now U.S. Pat. No. 4,684,979 and Japanese Patent Application No. 58-144742, for example, describe how scanning systems of this type reproduce points of an original precisely onto corresponding points of a reproduction image. However, in this type of scanning system, it is necessary to determine a specific point, for example, a beginning or an ending scan point, for each original positioned on the original scanning drum. Moreover, if originals are to be positioned obliquely, this type of system requires a special device for that purpose, such as the one disclosed in the Japanese Patent Publication No. 54-100802.

Japanese Patent Publication No. 58-90640 discloses one method for eliminating such inconveniences by projecting originals on a particular plane, e.g., that of a magnification measurer, obtaining coordinates of a specific point of each original image on that plane and determining the beginning points of a trimming process as well as other necessary points on the basis of those coordinates. However, to obtain arranged reproduction images on a photosensitive material by means of the composing scanner, it is necessary to position originals more efficiently on the original scanning drum.

SUMMARY OF THE INVENTION

It is thus a general object of the invention to obtain reproduction images arranged precisely in a predetermined manner. It is a more particular object of this invention to provide a method of an apparatus for precisely and efficiently determining trimming areas for plural originals on an original image scanning drum of an image reproducing system.

This invention is characterized primarily by the following. First an operator forms a block copy on which frames indicating trimming areas of every reproduction image (hereinafter "recording trimming frames") are configured. Second, the operator applies to a CPU recording trimming frame position data obtained from the block copy and for predetermined magnification data. Then, frames which indicate trimming areas of all the original images (hereinafter "scanning trimming frames") are configured on a translucent sheet. The CPU calculates the positions and sizes of those frames on the basis of the position and magnification data of the recording trimming frames. The operator now places a transparent sheet on the translucent sheet placed on a light table, positions the originals on that transparent sheet, rotating them at desired, angles according to said scanning trimming frames, and places the transparent sheet on the original scanning drum of the image reproducing system.

Recording trimming and scanning trimming frame data as well as magnification data are stored in a memory device and utilized later in the scanning and reproduction of images.

The above and other objects and features of the present invention can be appreciated more fully from the following detailed description when read with reference to the accompanying drawings.

PREFERRED EMBODIMENT OF THE INVENTION

Figure 1A:
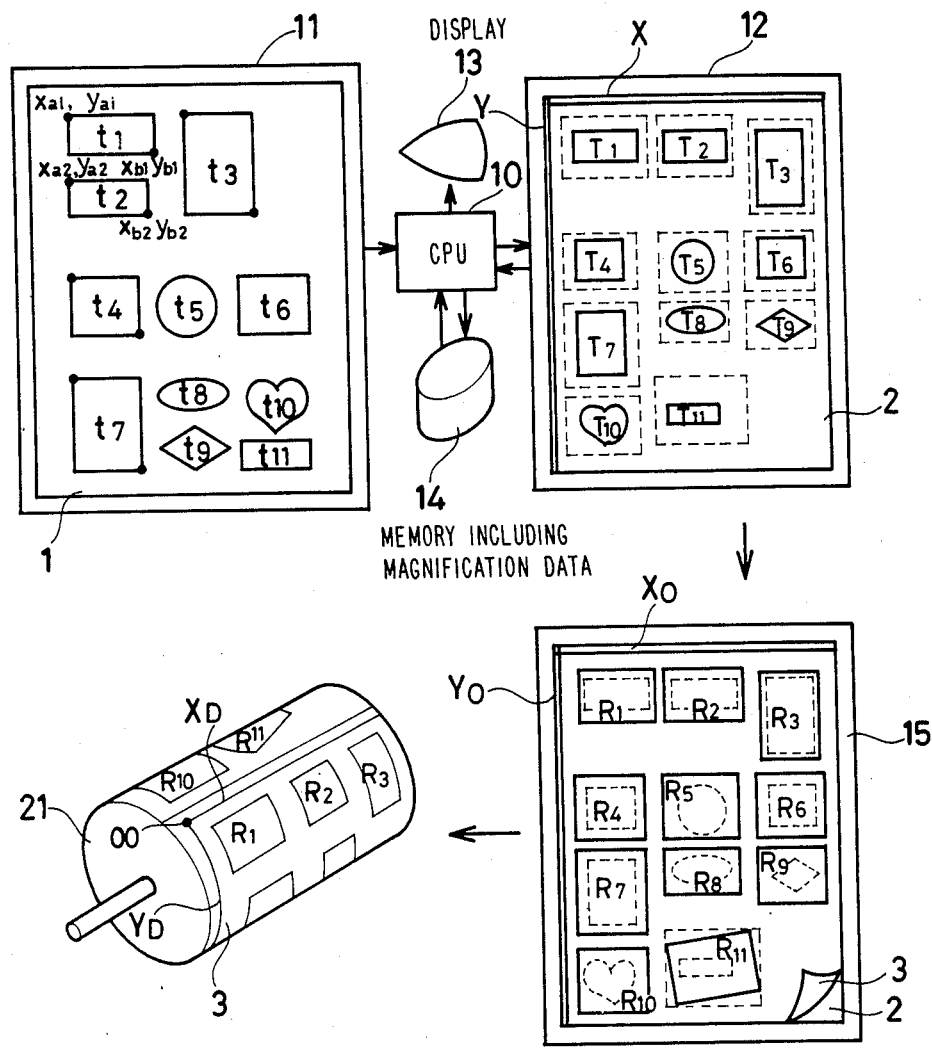
FIG. 1(a) is a view of a sequence of steps for laying out originals on a recording trimming frame, helpful for explaining the present invention.
Figure 1B:
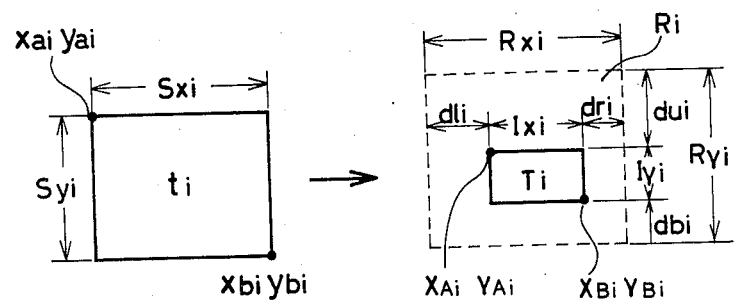
FIG. 1(b) is a schematic view showing a relation between two kinds of frames.

FIG. 1(b) shows a recording trimming frame $t_i$, a scanning trimming frame $T_i$ and a frame for an original $R_i$ (shown with broken lines and identified as an original frame in the following description), which includes a space for adhesive tapes to fasten originals. An adhesive tape is illustrated in FIG. 1 (b) at 4, for example.

First, as is conventional, an operator forms a block copy 1 on which recording trimming frames $t_i$ [FIG. 1(a)] for originals $R_i$ (where i=1 to n) are configured precisely the same as the final print, i.e., on which recording trimming frames of the same size and configuration are located at the same position and same angle of rotation as the final print. These coordinates $(x_{ai}, y_{ai})$ of points $a_i$ and $(x_{bi}, y_{bi})$ of points $b_i$, as shown in FIG. 1(a), are obtained for each recording trimming frame $t_i$ by means of a digitizer 11 and input to a CPU 10. On the basis of these coordinates, the CPU 10 calculates length $S_{xi}$ of each recording trimming frame in the sub-scanning direction and length $S_{yi}$ in the main scanning direction according to equations (1) below, (although it is possible to obtain these two lengths by direct measurement).

$$\begin{rcases} S_{xi} = x_{bi} - x_{ai} \\ S_{yi} = y_{bi} - y_{ai} \end{rcases} \quad (1)$$

To permit reexamination by the operator it is also possible for the CPU 10 to display all the recording trimming frames to be configured on the block copy 1 on a screen of a displaying device 13.

Then, length $I_{xi}$ of the scanning trimming frame $T_i$ in the sub-scanning direction and $I_{yi}$ in the main scanning direction, are obtained on the basis of the values $S_{xi}$ and $S_{yi}$ as well as of magnification $M_{xi}$ in the sub-scanning direction and of $M_{yi}$ in the main scanning direction, previously input to the CPU 10. Thus:

$$\begin{rcases} I_{xi} = S_{xi}/M_{xi} \\ I_{yi} = S_{yi}/M_{yi} \end{rcases} \quad (2)$$

The operator then, by means of a plotter 12, positions the scanning trimming frames $T_i$ for originals $R_i$ with a predetermined space between each other on a translucent sheet 2 (hereinafter "area configured sheet"), e.g., a sheet of tracing paper, as described in detail below. On the area configured sheet 2 also are drawn an X-axis and a Y-axis, each of which corresponds to the $X_D$-axis in the sub-scanning direction and $Y_D$-axis in the main scanning direction, drawn on the original scanning drum 21, respectively.

A transparent sheet 3 on which an $X_O$-axis and a $Y_O$-axis are drawn (identified hereinafter as a "layout sheet") is positioned on the area configured sheet 2 placed on a light table 15, with these two axes coinciding with said X-axis and Y-axis, respectively. The operator sticks originals $R_i$ on the layout sheet 3 since the area to be reproduced of each original does not exceed the scanning trimming frame $T_i$, seen by the operator through the layout sheet 3.

The operator now places the layout sheet 3 on the original scanning drum 21 of an image reproducing system with said $X_O$-axis and $Y_O$-axis coinciding with $X_D$-axis and $Y_D$-axis on the original scanning drum 21.

As a result, the X-axis on the area configured sheet 2, $X_O$-axis on the layout sheet 3 and $X_D$-axis on the original scanning drum 21 coincide with one another. Also coinciding are the Y-axis on the area configured sheet 2, the $Y_O$-axis on the layout sheet 3 and the $Y_D$-axis on the original scanning drum 21, as well as the three intersections of the three pairs of axes respectively. Thus, it is possible to regard the position data of scanning trimming frames $T_i$ on the plotter 12 as the position data on the original scanning drum 21. This information is stored in a memory 14, in a form shown in Table 1.

Trimming frames of figures other than a rectangle, for example, a circle or a rhombus, can also be configured at fixed places in the same manner. In addition, the operator can rotate any original at any desired angle when he sticks them on the layout sheet 3.

To explain further, an original file as shown in Table 1 is prepared for every original in the memory device. In regard to recording trimming frames, length $S_{xi}$ and $S_{yi}$ data, and magnification $M_{xi}$ and $M_{yi}$ data are written in the 6th and 7th item of corresponding original files.

The operator determines the size $d_u$ of the upward space between a scanning trimming frame and a corresponding original frame, $d_b$ of a downward space, $d_l$ of left-handed space, $d_r$ of a right-handed space, length $R_X$ of the original in the sub-scanning direction and $R_Y$ in the main scanning direction, and writes these data in the "original" file. The original frames $R_i$ as shown with broken lines in FIG. 1(b) are configured on the basis of those data on the area configured sheet 2. Upon determination of these data, it must be considered how large the space is for adhesive tape and whether the original is oblique. Further, it is preferable to allocate originals leaving some room between each other to account for allocation errors.

The original file also has other necessary data, such as color separation data, which, however, are herein disregarded as irrelevant.

Figure 2:
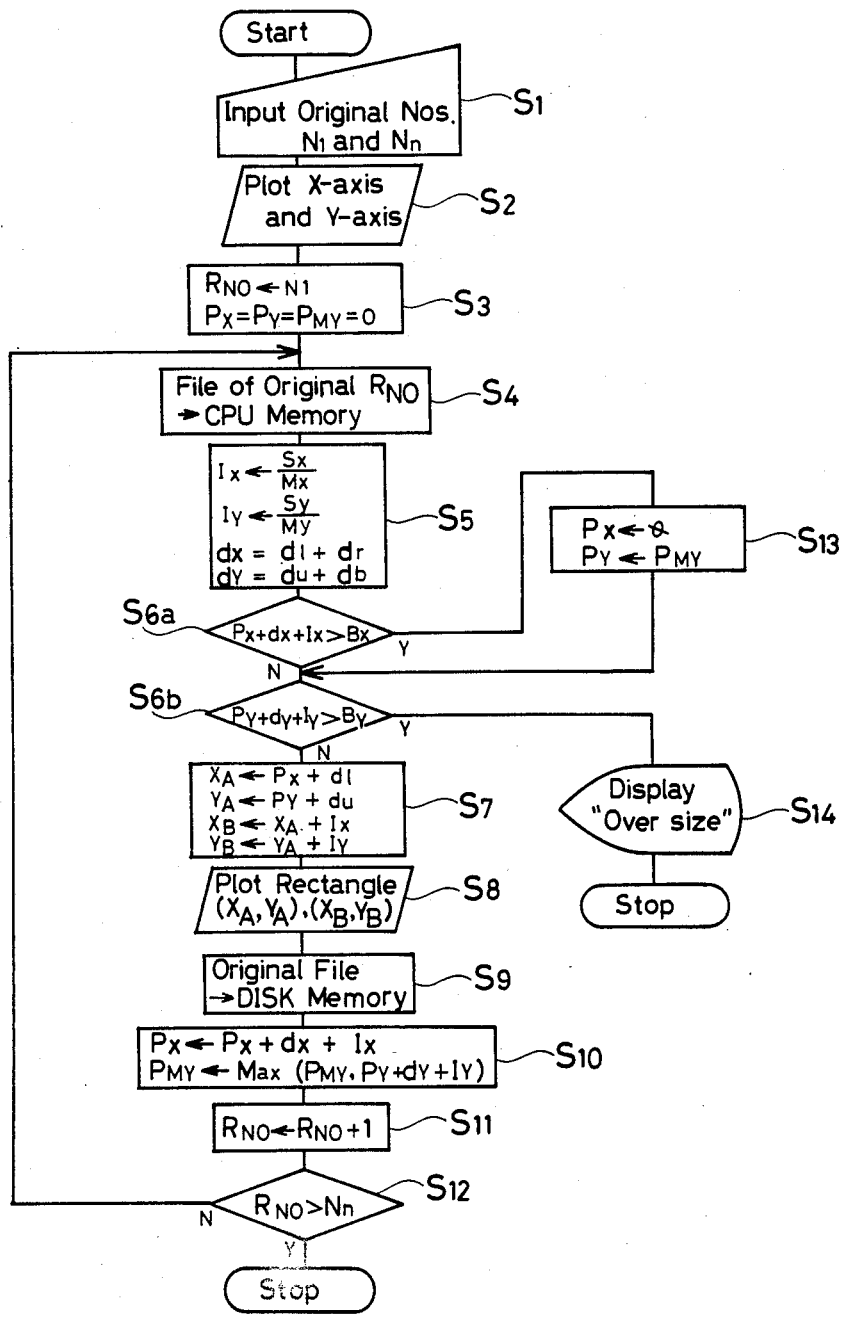
FIG. 2 is a flow chart indicating the operation of a CPU in the invention.
Figure 3:
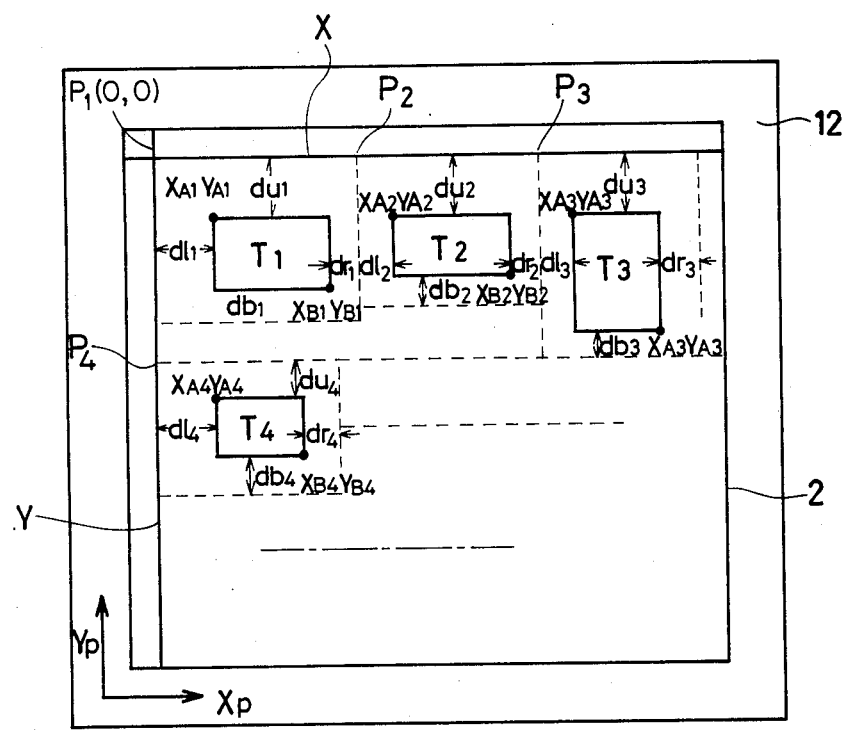
FIG. 3 is a diagram of a method of changing the configuration of a row.

Thereafter, the area configured sheet 2 is formed in accordance with a flow chart shown in FIG. 2 by means of plotter 12. FIG. 3 shows the area configured sheet 2 in the course of being formed, that is, a translucent sheet on which scanning trimming frames $T_i$ are being configured in accordance with the flow chart.

Initially, the smallest and largest numbers $N_1$, $N_n$ of the originals to be processed are input to the CPU 10 at step $S_1$. Then the X-axis and Y-axis, on the basis of which scanning trimming frames are configured at later steps, are drawn on the translucent sheet 2 at step $S_2$. This translucent sheet 2 is large enough to cover the surface of original scanning drum 21 of an image reproducing system.

The X - Y coordinate system on the area configured sheet 2 is the reference to indicate position of points in the following description. The ploter 12, however, has its own $X_p$—$Y_p$ coordinate system and these two systems have a relation expressed in equations (3), in which coordinates ($\overline{O}_{XP}$, $\overline{O}_{YP}$) are the position of the origin (O, O) of the X-Y coordinate system in the $X_p$, $Y_p$ system as:

$$X_p = X + \overline{O}_{XP} \quad (3)$$

$$Y_p = -Y + \overline{O}_{HD\ YP}$$

At step $S_3$, the number $R_{No}$ of the original to be precessed is made the smallest number $N_1$. At the same time a reference point $P(P_X, P_Y)$, on the basis of which the position of each scanning trimming frame on the translucent sheet 2 is determined, is set on the origin (O, O), that is, $P_1 = (P_{X1}, P_{Y1}) = (0,0)$. The maximum value $P_{MY}$ in the main scanning direction, explained later in detail, is made "O".

The "original" file relating to the original $R_1$ which is processed initially, that is, of which the number of the original, is $N_1$, is input to a memory of the CPU 10 from the memory device 14 at a step $S_4$.

At step $S_5$, the length $I_{X1}$ of the scanning trimming frame $T_1$ in the sub-scanning direction and the length $I_{Y1}$ in the main scanning direction are determined by equations (2). In addition, space $d_X$ in the sub-scanning direction and space $d_Y$ in the main scanning direction are determined according to equations (4a) and (4b) as follows:

$$d_X = d_l + d_r \quad (4a)$$

$$d_Y = d_u + d_b \quad (4b)$$

It is now determined (steps $S_{6a}$ and $S_{6b}$) whether the following inequalities (5a) and (5b) are satisfied:

$$P_X + d_X + I_X > B_X \quad (5a)$$

$$P_Y + d_Y + I_Y > B_Y \quad (5b)$$

(where $B_X$ and $B_Y$ represent the length of the translucent sheet 2 in the sub-scanning direction and the main scanning direction, respectively).

If it is determind in steps $S_{6a}$ and $S_{6b}$ that the above inequalities are not satisifed, that is, that the scanning trimming frame $T_1$ is not larger than the translucent sheet 2 either in the sub-scanning direction or in the main scanning direction, then at step $S_7$ the CPU 10 generates a point ($X_{A1}$, $Y_{A1}$) at which the scanning trimming frame $T_1$ begins to be configured (identified herein as a "beginning point") according to the following four equations:

$$X_A = P_X + d_l \quad (6a)$$

$$Y_A = P_Y + d_u \quad (6b)$$

$$X_B = X_A + I_X \quad (7a)$$

$$Y_B = Y_A + I_Y \tag{7b}$$

At step $S_8$, the plotter 12 configures the scanning trimming frame $T_1$ in accordance with the above coordinates $(X_{A1}, Y_{A1})$ and $(X_{B1}, Y_{B1})$, written in the second item of Table 1 at step $S_9$.

At step $S_{10}$, before drawing scanning trimming frame $T_2$, an X-cooridnate $P_{X2}$ of the reference point $P_2$ for the frame $T_2$ is detrermined by adding a distance $d_{r1}$ to the X-coordinate $Y_{B1}$ of the ending point $(X_{B1}, Y_{B1})$. As the reference point $P_1$ for the scanning trimming frame $T_1$ is placed on the origin $(O, O)$, the X-coordinate $P_{X2}$ is determined by the following equation, wherein $P_{X1} = 0$:

$$P_{X2} = P_{X1} + d_{11} + d_{r1} + I_{X1}$$

$$= P_{X1} + d_{X1} + I_{X1}$$

$$= d_{X1} + I_{X1}$$

Generally, an X-coordinate $P_X$ of a reference point P is determined by the following operation (8a) at step $S_{10}$ except when the result of step $S_6$ is "Y":

$$P_X \leftarrow P_X + d_X + I_X \tag{8a}$$

In regard to the main scanning direction, since it is presupposed in this example that scanning trimming frames $T_i$ are configured in order in the sub-scanning direction, a Y-coordinate of the reference point $P_2$ need not be changed from that of the point $P_1$ at this step.

Generally, Y-coordinate $P_Y$ of the reference point P does not change as long as the result of step $S_{6a}$ is "N" and, on the other hand, the CPU 10 performs the following operation (8b) after each scanning trimming frame is configured:

$$P_Y \leftarrow P_Y + d_Y + I_Y \tag{8b}$$

The CPU 10 also determines the maximum value $P_{MY}$ in the main scanning direction by performing the following operation (8c) at step $S_{10}$:

$$P_{MY} \leftarrow \text{Max } P_{MY}, P_Y + d_Y + I_Y \tag{8c}$$

The number of the original is incremented by 1 (in this example made $N_2$) at a step $S_{11}$.

At step $S_{12}$, when the new number determined at step $S_{11}$ is smaller than the last original number $N_n$, the procedure returns to step $S_4$ in which an original file corresponding to the new original is input to the appropriate memory of the CPU 10 from the memory device 14, and steps $S_4$–$S_{12}$ are repeated. When the original number provided at step $S_{11}$ becomes, with the proceeding process, larger than the last number $N_n$, the process is finished.

When the result of step $S_{6a}$ is "Y", that is, when it is determined that the scanning trimming frame $T_1$ to be configured exceeds the translucent sheet 2 in the sub-scanning direction at that step, at the next step $S_{13}$ the X-coordinate $P_X$ of the reference point P for the frame $T_i$ is made O and a Y-coordinate $P_Y$ is made the maximum value $P_{MY}$ in the main scanning direction determined by the operation (8c) for the preceding frame. That is, the present frame is configured on the next row in the main scanning direction, such as a frame $T_4$ shown in FIG. 3. In addition, at step $S_{14}$, an "error" message is displayed on a screen of the displaying device 13, when the result of the step $S_{6b}$ is "Y", that is, when it is determined in the main scanning direction.

The above description is an example of the forming process of the area configured sheet 2. In an advantageous manner, when it is determined that the trimming frame exceeds the area configured sheet in the main scanning direction, it is also possible to exchange the translucent sheet and configure the present frame on the new sheet.

Scanning trimming frames of figures other than a rectangle, for example, a circular or an elliptical frame, are configured in accordance not with beginning and ending points data, but with parameters defining the figures, for example, coordinates of the center and radius of a circle, the number of angles or coordinates for each vertex of a polygon, etc.

It is also possible to provide the original scanning drum 21, the plotter 12 and the light table 15 with pins at corresponding places for fixation of sheets. This establishes a common position reference on the area configured sheet 2, the layout sheet 3 and the original scanning drum 21, in place of drawing X- and Y-axes on each of them.

To further facilitate the work, not only the scanning trimming area but the number, name, etc., of the original could be written on the area configured sheet 2.

An alogrithm can be adopted to minimize the movement of the scanning head and the recording head of the image reproducing system when images are reproduced, to shorten the time necessary for the process. The algorithm can also configure as many trimming frames as possible on a translucent sheet 2.

Although translucent and transparent sheets are necessary in the example, it is possible to provide only one transparent sheet by making the plotter 12 configure frames with erasable ink on one side of that sheet, sticking the originals $R_i$ on the other side and thereafter erasing the ink.

Finally, recording trimming frames position data on the recording drum and scanning trimming frames position data for originals on the scanning drum are input to the CPU 10. Reproduction of images is performed in accordance with these data by means of methods and systems disclosed in the Japanese Patent Applications No. 58-157236 and 59-25853, and U.S. patent application Ser. No. 625,782 now U.S. Pat. No. 4,684,979.

Coordinates for recording trimming frames are, of course, able to be inut to the CPU 10 without the digitizer 11, for example, by using a plotting paper for the block copy 1.

The method of this invention is particularly well suited to a composing scanner but can also be adopted for conventional scanners. Moreover, the method of this invention improves the performance of layout scanners.

As described above, the method of this invention makes it possible to correctly determine trimming areas for originals on the scanning side and angles at which each original is stuck onto the layout sheet in order to obtain a reproduction image arranged precisely as desired. Originals are stuck onto a transparent layout sheet at desired angles in accordance with an area configured sheet formed on the basis of position data obtained from a block copy, and that sheet is placed on an original scanning drum of a composing scanner.

In this disclosure, there is shown and described only the preferred embodiment of the invention, but as aforementioned, it is to be understood that the invention is capable of use in various other combinations and environments and is capable of changes or modifications within the scope of the inventive concept as expressed herein.

TABLE 1

| | Original File | |
|---|---|---|
| (1) | Original Number $R_{No}$ | $N_i$ |
| (2) | Beginning Point on the Original Scanning Drum | $X_{Ai} Y_{Ai}$ |
| | Ending Point on the Original Scanning Drum | $X_{Bi} Y_{Bi}$ |
| (3) | Size of the Original | $R_{Xi} R_{Yi}$ |
| (4) | Space between the Scanning Trimming Frame and the Original Frame | $d_{ui}, d_{bi}, d_{li}, d_{ri}$ |
| (5) | Size of the Scanning Trimming Frame | $l_{Xi} l_{Yi}$ |
| (6) | Magnification | $M_{xi} M_{yi}$ |
| (7) | Size of the Recording Trimming Frame | $S_{xi} S_{yi}$ |

We claim:

1. A method of positioning plural originals on an original scanning drum of an image reproducing system, comprising the steps of:

(a) forming a block copy on which reproduction frames indicating trimming areas of all reproduction images are configured, wherein said reproduction frames are rectangularly shaped;

(b) obtaining position data of said reproduction frames obtained and also obtaining magnification data;

(c) determining position and size of original frames indicating the trimming areas of every original in accordance with data obtained in step (b);

(d) configuring said original frames on a first sheet as determined in step (c);

(e) sticking originals on a transparent second sheet placed on the first sheet so that the area to be reproduced of each original does not exceed the corresponding original frame configured in step (d), visible through the first sheet; and (f) placing the transparent second sheet on said original scanning drum.

2. A method as recited in claim 1, wherein said original frames are rectangularly shaped.

3. A method as recited in claim 1 including establishing a common coordinate system for which frames of trimming areas are configured on the translucent sheet and for the original scanning drum, so that position data size data obtained in step (c) are utilized both in scanning and reproduction of images.

4. A method of positioning plural originals on an original scanning drum of an image reproducing system, comprising the steps of:

(a) forming a block copy on which reproduction frames indicating trimming areas of reproduction images are configured, wherein said reproduction frames are rectangularly shaped;

(b) obtaining frame position data with a digitizer on which the block copy is placed, obtaining magnification data and applying said position and magnification data to a CPU;

(c) determining position and size of original frames which indicate trimming areas of said originals with the CPU in response to the data obtained in step (b);

(d) configuring said original frames with erasable ink on one side of a transparent sheet, as determined in step (c);

(e) sticking plural originals on the other side of the transparent sheet so that the area to be reproduced of each original does not exceed the corresponding original frame configured in step (d) and is able to be recognized through the transparent sheet; and (f) placing the transparent sheet on said original scanning drum.

5. A method as recited in claim 4 including establishing a common coordinate system for which frames of trimming areas are configured on the translucent sheet and for the original scanning drum, so that position data size data obtained in step (c) are utilized both in scanning and reproduction of images.

6. A method as recited in claim 4, wherein said original frames are rectangularly shaped.

7. An apparatus for establishing positions of plural original images on an original image scanning drum of an image reproducing system, comprising:

a block copy for recording trimming frames of reproduction images;

digitizer means for digitizing coordinates of said recording trimming frames;

means for inputting magnification data;

processor means responsive to said digitized coordinates and to said magnification data for determining lengths of said trimming frames in scanning and sub-scanning directions;

a transparent layout sheet for receiving originals;

a translucent sheet;

plotter means controlled by said processor means for configuring said trimming frames on said translucent sheet; and means for sticking the original images on said transparent sheet in positions corresponding to the positions of said trimming frames in said translucent sheet; said transparent sheet and original adapted to be positioned on said original scanning drum.

8. An apparatus as recited in claim 7 wherein said trimming frames are rectangularly shaped.

9. An apparatus for establishing positions of plural original images on an original image scanning drum of an image reproducing system, comprising:

a block copy for recording trimming frames of reproduction images;

digitizer means for digitizing first coordinates of said recording trimming frames;

means for receiving preselected magnification data;

a transparent layout sheet for receiving originals;

a tanslucent sheet;

plotter means having second coordinates configuring the trimming frames on said translucent sheet;

means for sticking the original images on said transparent sheet in positions corresponding to the positions of said trimming frames in said translucent sheet, the transparent sheet and original adapted to be positioned on said original scanning drum; and processor means responsive to said digitizer means and to said magnification data for controlling said plotter means, said processor means including programming means for identifying the originals by numbers, means for translating between the first and second coordinates and for establishing an origin of the first coordinate system at a reference position on each trimming frame; means for detemining main scanning direction and sub-scanning direction lengths of each trimming frame and storing said lengths and associated trimming frame identifying numbers; means for determining whether each trimming frame is within bounds of the translucent sheet in the main and sub-scanning directions; and means responsive to said determining means for configuring scanning trimming frames to be drawn by said plotter means.

10. An apparatus as recited in claim 9 wherein said trimming frames are rectangularly shaped.

11. A method of positioning plural originals on an original scanning drum of an image reproducing system, comprising the steps of:
 (a) forming a block copy on which reproduction frames indicating trimming areas of reproduction images are configured;
 (b) obtaining frame position data with a digitizer on which the block copy is placed, obtaining magnification data and applying said position and magnification data to a CPU;
 (c) determining position and size of original frames which indicate trimming areas of said originals with the CPU in response to the data obtained in step (b);
 (d) configuring said original frames with erasable ink on one side of a transparent sheet, as determined in step (c);
 (e) sticking plural originals on the other side of hte transparent sheet so that the area to be reproduced of each original does not exceed the corresponding original frame configured in step (d) and is able to be recognized through the transparent sheet; and
 (f) placing the transparent sheet on said original scanning drum;
 wherein said configuring step comprises the step of plotting said original frames at the positions determined in step (c) under control of said CPU.

12. A method of positioning plural originals on an original scanning drum of an image reproducing system, comprising the steps of:
 (a) forming a block copy on which reproduction frames indicating trimming areas of all reproduction images are configured;
 (b) obtaining position data of said reproduction frames obtained and also obtaining magnification data;
 (c) determining position and size of original frames indicating the trimming areas of every original in accordance with data obtained in step (c);
 (d) configuring said original frames on a first sheet as determined in step (c);
 (e) sticking originals on a transparent second sheet placed on the first sheet so that the area to be reproduced of each original does not exceed the corresponding original frame configured in step (d), visible through the first sheet; and
 (f) placing the transparent second sheet on said original scanning drum,
 wherein said step (c) of determining position and size of original frames is performed by a CPU based on said position data obtained in step (b), and wherein said configuring step (d) comprises the step of plotting said original frames at the positions determined in step (c) under control of said CPU.

13. A method as recited in claim 12, wherein said step (c) of determining position and size of original frames indicating the trimming areas of every original is performed by said CPU further based on said magnification data obtained in step (b), and wherein said plotting step comprises the steps of:
 controlling a plotter by said CPU based on the position and size of said original frames determined by said CPU,
 said plotter controlled for plotting said determined positions and sizes of said original frames on said first sheet.

* * * * *